C. GUELICHER.
DEVICE FOR PREVENTING HORSES FROM RUNNING.
No. 170,552.                              Patented Nov. 30, 1875.
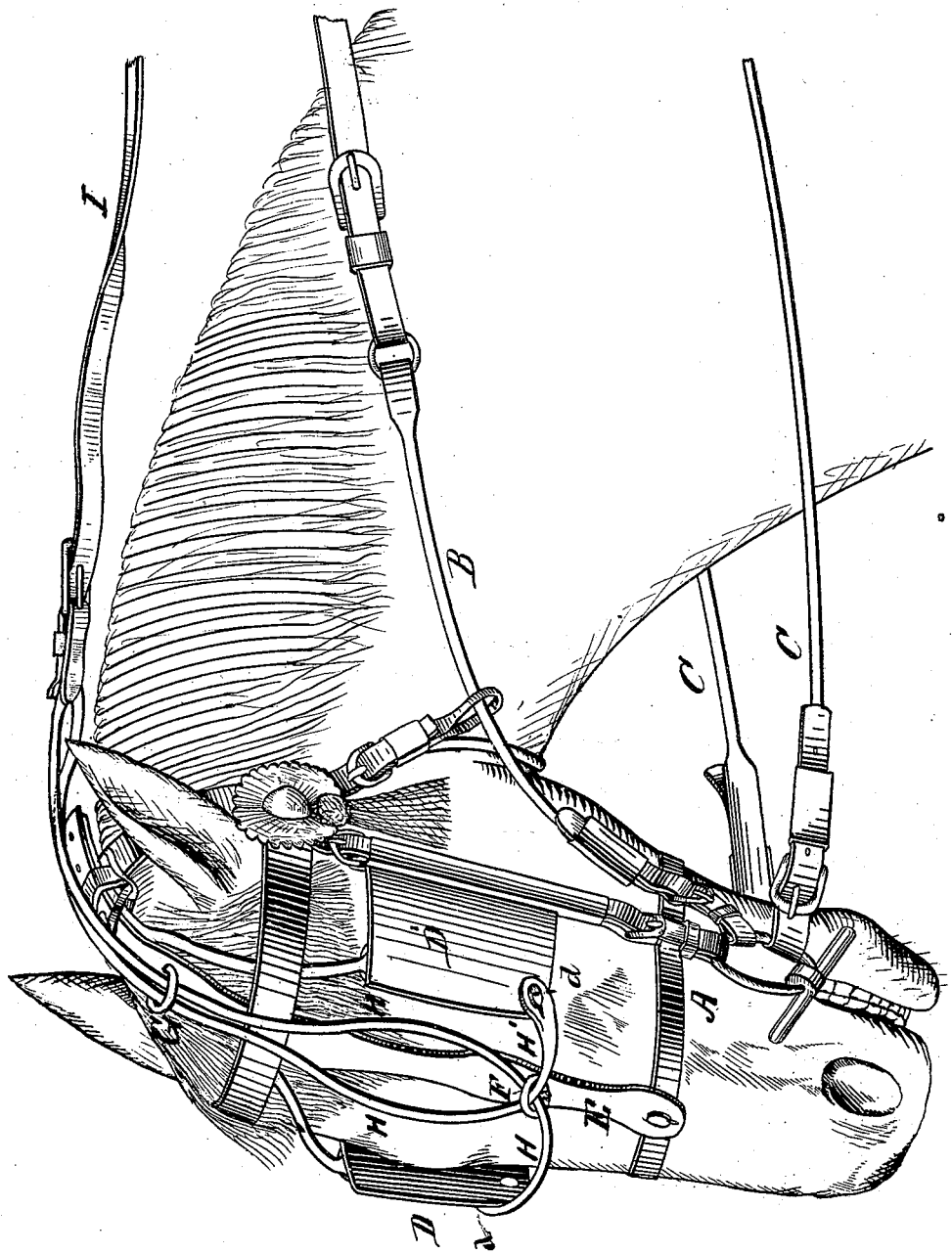
WITNESSES
E. H. Bates
Frank J. Masi
INVENTOR
Charles Guelicher,
Chipman & Somer & Co,
ATTORNEYS

UNITED STATES PATENT OFFICE.

CHARLES GUELICHER, OF NEWARK, NEW JERSEY.

IMPROVEMENT IN DEVICES FOR PREVENTING HORSES FROM RUNNING.

Specification forming part of Letters Patent No. 170,552, dated November 30, 1875; application filed September 26, 1874.

*To all whom it may concern:*

Be it known that I, CHARLES GUELICHER, of Newark, in the county of Essex and State of New Jersey, have invented a new and valuable Improvement in Bridles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my bridle.

This invention has relation to means whereby a driver is enabled to control unruly or runaway horses, by suddenly depriving them of sight. It is based upon the fact that if a runaway or unmanageable horse be temporarily blinded he will be at once reduced to submission, and become docile; and the nature of the invention consists in the novel construction and arrangement, in connection with the blinders of a bridle and with the straps or cords for operating the same, of a ring, rigidly secured to the forehead-strap, at a point thereon near the lower edges of the said blinders, serving as a pulley, and of a second ring near the upper end of the said forehead-strap, serving to prevent the entanglement of the said cords or straps for drawing blinders inward toward each other with the other straps of the bridle, whereby the driver is able at any time, and in the most effectual manner, to subdue the animal by temporarily depriving him of sight, and at the same time not encumber the head of the horse with an undue weight or collection of straps, as will be hereinafter more fully explained.

In the annexed drawings, A designates a bridle of the usual construction. B are the check-reins; and C the reins proper, passing through the rein-ring at each side of the saddle. D D' designate the blinders, to the lower front edge of which are rigidly secured studs *d*, for a purpose hereinafter explained. E designates the forehead-strap, upon which is rigidly secured, at a point between the blinders, and about the lower edge thereof, a pulley-ring, F, and to the upper end of which, at that point thereof where it passes between the ears of the horse, is rigidly secured a second ring, G. H H' designate straps, preferably rounding, the lower ends of which are buttoned over the studs *d* of the blinders. They are then passed into the hooks F G successively, when they unite and are rigidly secured to a single strap, I, of sufficient length to extend within reach of a driver seated in the vehicle.

When the animal from any cause becomes unmanageable or runs away a slight pull upon the strap I will cause the blinds to be drawn inward toward each other, closing in upon the eyes of the horse, effectually depriving him of sight for the time, thereby subduing and reducing him to submission by the surprise occasioned by the sudden and unexpected deprivation of sight. In the act of closing the blind the ring F serves as a pulley, and being situated near the lower edge of the blinders renders the deprivation absolute and positive, while the upper ring G serves to prevent the straps H H' from becoming entangled with the straps or projecting studs of the bridle.

By this arrangement, while the horse may be completely blinded, when desired, he is not annoyed by straps flapping about on his head; nor is he at any time even partially deprived of sight by straps crossing in front of his eyes, since that portion of the straps between the blinders and the pulley-ring F is below his eyes, while the rest of them passes between the eyes up the middle of the forehead.

The strap I is shown as attached to one of the reins near the hand end thereof—an arrangement which I greatly prefer; but I do not confine myself thereto, as I may cause it to be fastened to the rim of the spatter-board, where it would still be within reach of the driver.

I am well aware that subduing a horse by closing the blinders inward over his eyes to deprive him of sight is not new; hence, I do not make a broad claim to this device.

What I claim as new, and desire to secure by Letters Patent, is—

The blinders D D', provided with the studs *d d'*, in combination with the strap E, provided with the rings F G, and straps H H', and I, the whole constructed, arranged, and operated in the manner set forth.

In testimony that I claim the above I have hereunto subscribed my name in the presence of two witnesses.

CHARLES GUELICHER.

Witnesses:
 CHARLES T. DAY,
 EDWARD SPARTH.